May 25, 1965   O. DAHLE   3,184,963
MEANS FOR MEASURING TENSILE OR COMPRESSIVE STRESSES IN
AN OBJECT OF MAGNETOSTRICTIVE MATERIAL
Filed Dec. 10, 1962   3 Sheets-Sheet 1
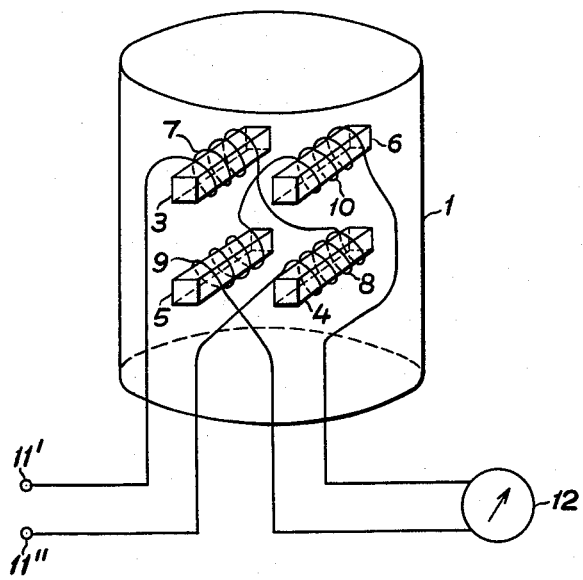
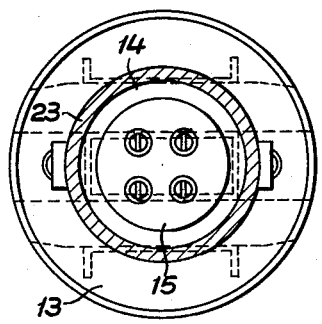
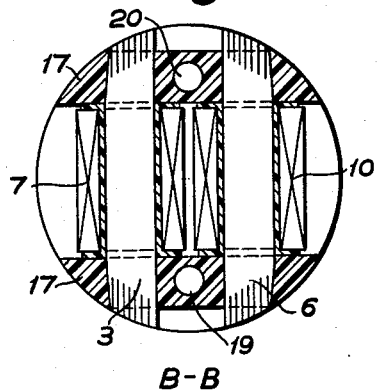
INVENTOR.
ORVAR DAHLE
BY
ATTORNEYS

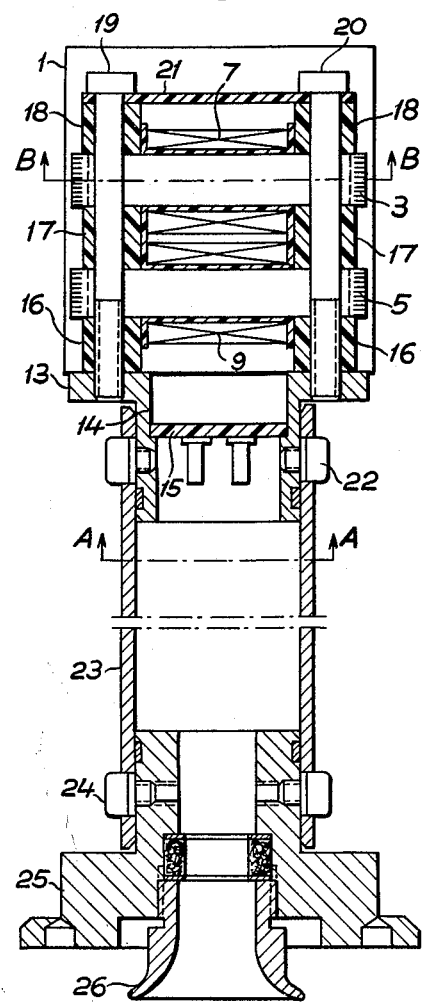

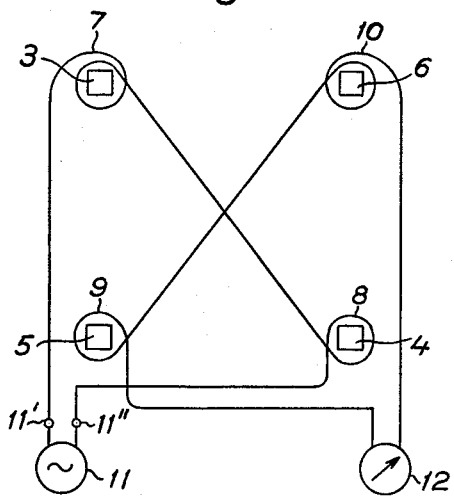
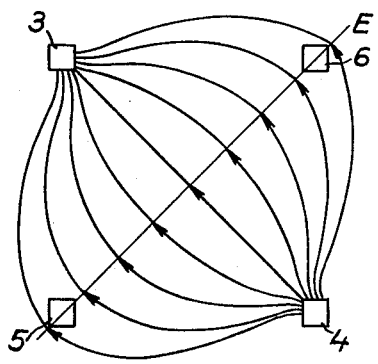
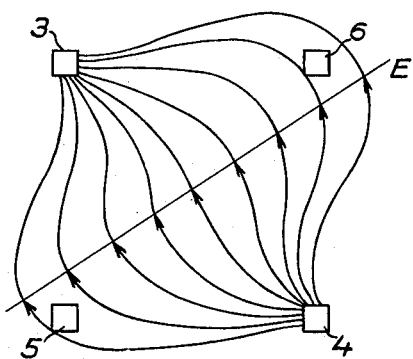

United States Patent Office 3,184,963
Patented May 25, 1965

3,184,963
MEANS FOR MEASURING TENSILE OR COMPRESSIVE STRESSES IN AN OBJECT OF MAGNETOSTRICTIVE MATERIAL
Orvar Dahle, Vasteras, Sweden, assignor to Allmänna Svenska Elektriska Aktiebolaget, Vasteras, Sweden, a Swedish corporation
Filed Dec. 10, 1962, Ser. No. 244,239
Claims priority, application Sweden, Dec. 23, 1961, 12,932/61
2 Claims. (Cl. 73—88.5)

In U.S. Patent 2,912,642 is shown and described a means for indicating or measuring mechanical stresses in bodies of magnetostrictive material. With this embodiment the alteration of the magnetic anisotropy in the material is utilized, which occurs when the material is subjected to mechanical stresses. The means consists of two systems of magnetic cores arranged perpendicular to each other and provided with coils. With the help of one of the magnetic systems a magnetic field is generated which flows partly through the material in the object whose stress shall be determined. The other magnetic system is connected to a measuring instrument. If the material is unloaded and magnetically isotropical, no voltage is induced in the measuring system when the first magnetic system is fed with alternating current. When the material is exposed to mechanical stresses a magnetic anisotropy occurs which causes a distortion of the magnetic field, which causes a voltage to be induced in the other magnetic system.

The known means is suitable for measurements which shall be carried out on the outside of an object. In some cases, however, it is desirable to carry out the measurement in a bore in the object. In order to make the measuring independent of bending stresses in the object, two measuring means working on diametrically opposite surfaces in the bore must be used in such a case. With such an arrangement, a tensile stress caused by the bending at one point of measurement is compensated by an equally large compressive stress at the opposite point of measurement. If the two measuring means have exactly the same sensitivity the bending stresses in this case will be wholly compensated.

In such a case as this the known means has, however, two important drawbacks. One is the difficulty with the help of two measuring means independent of each other in ensuring exactly equal measuring sensitivity at the two measuring surfaces. The other is that the U-form of the magnetic core also causes a substantial part of the space in the diametrical direction inside the boring to be taken up by iron cores, so that it cannot be used for the windings on the magnetic cores. In order to obtain sufficient volume for the windings, the diameter of the bore must be made larger in this case than is suitable in many cases with regard to the object to be measured.

The present invention consists of an improvement of the known means for measuring of tensile or compressive stresses in magnetostrictive material and preferably in such objects which have a cylindrical bore in which the measuring means can be inserted. Said measuring means consists of four magnetic cores, which are generally rod-shaped and separated from each other and arranged parallel to a diameter in the bore. Each of said cores has a winding and two of these windings are series connected to each other and to an alternating current source. The other two windings are also series connected and connected to an alternating-voltage-sensitive measuring means.

On the enclosed drawing FIGURE 1 shows a principle sketch of a measuring means according to the invention. FIGURE 2 shows a longitudinal section through an arrangement for measuring mechanical stresses in an extended measuring object and FIGURES 3 and 4 show cross sections at A—A and B—B in FIGURE 2. FIGURE 5 is a schematic front view of the measuring means of FIGURE 1. FIGURES 6 and 7 show the pattern of the lines of magnetic flux on the surface of the bore in the magnetostrictive material under various conditions.

The measuring means shown in FIGURE 1 consists of a cylindrical body 1, which is built in a way more closely described in connection with FIGURE 2. The body contains four rod-shaped magnetic cores 3, 4, 5 and 6, each supplied with a winding 7, 8, 9 and 10. The cores are parallel with each other and with a diameter in the cylindrical body and are so arranged in the cylindrical body that their end faces are situated in the corners of an imaginary quadrangle lying on the surface of the body and having its plane perpendicular to said diameter. Preferably two parallel sides of said quadrangle are parallel to the longitudinal axis of the cylindrical body. The two windings 7 and 8 on the diametrically oppositely situated cores 3 and 4 are series connected and wound in such a manner that when a voltage source is connected to the terminals 11' and 11" the magnetic flux in the core 3 is of opposite direction from the flux in the core 4. As these two fluxes flow in opposite directions inside the body they are joined together outside it and flow through the material which surrounds the measuring means. The four cores are so arranged in the body 1 that the connecting lines along the cylinder surface between the ends of cores 3 and 4 as well as 5 and 6 form a symmetrical cross. From FIGURE 5 it is seen that the exciting coils 7 and 8 mounted on the cores 3 and 4 are connected to an alternating voltage source 11 by terminals 11' and 11". The two coils are differentially wound so that the flux excited in coil 7 will add to the flux excited in coil 8 and the two fluxes are closed, at the ends of the cores 3 and 4, on the surface of the bore in the magnetostrictive material. When the magnetostrictive material is not subjected to any mechanical stress, the pattern of the lines of magnetic flux on the surface of the magnetostrictive material has the shape shown in FIGURE 6. The two cores 5 and 6 are situated on the same equipotential line E and consequently no voltage is induced in the coils 9 and 10. When a mechanical force acts upon the magnetostrictive material the magnetic flux in said material will be deformed as indicated by FIGURE 7. The central equipotential line E has moved and the two cores 5 and 6 are situated at points of different magnetic potential. FIGURE 7 shows the magnetic flux figure on one side of the bore in the magnetostrictive material. On the diametrically opposite side the magnetic flux figure has the same appearance but the direction of the flux line is the opposite. From this it is obvious that the two ends of each of the cores 5 and 6 have different magnetic potentials and a magnetic flux will flow through the cores and induce a voltage in the surrounding coils 9 and 10. As is seen from FIGURES 1 and 5 the two coils are differentially wound and have the same ratio of turns and therefore the two voltages are added to each other and are of the same value.

The deformation of the magnetic flux depends on the mechanical force acting upon the magnetostrictive material. The voltages induced in the coils are dependent upon said deformation of the flux and consequently the current through the measuring means 12 is proportional to said mechanical force.

FIGURE 2 shows a longitudinal section through a measuring means according to the invention. The measuring body itself is built up on a flange 13 supplied with a projecting tube 14 which supports a connection terminal board 15. On top of the flange are two spacer elements 16 and on top of these are two magnetic cores 4 and 5 with coils 8 and 9. Further, there is a pair of spacer elements 17 and on top of these are two magnetic cores 3 and 6 with coils 7 and 10. Uppermost is a third pair of spacer elements 18. The whole is held together by two screws 19 and 20 which are screwed from the upper side through a covering plate 21, the three pairs of spacer elements and down into the threaded holes in the flange 13. After screwing up, the measuring body is cast in plastic and ground so that a cylindrical unit is formed, on the cylindrical surface of which the magnetic core ends are exposed.

In order to enable the measuring body to be inserted in a bore in the object to be measured, the measuring body is fastened by means of bolts 22 to a spacer tube 23, which at its lower part is fastened with screws 24 to a lower flange 25, which is fastened to one end of the object to be measured. The leads from the connection terminal board 15 are taken out through the spacer tube 23 and in an inlet nut 26 screwed into the lower flange.

If an object to be measured according to the invention is exposed for example to a compressive stress parallel with the bore, a magnetic anisotropy occurs in the object, so that the magnetic field is disturbed and a voltage is induced in the secondary coils 9 and 10. If the object is made of iron which has positive magnetostriction and is subjected to compressive stress, the reluctance along the surface of the bore will increase between the end faces of cores 3 and 5 and between the end faces of cores 4 and 6, while the reluctance decreases between the end faces of cores 3 and 6 and between the end faces of cores 4 and 5.

In this way part of the flux from the core 3 travels towards the core 6 and passes it, and in the same way part of the flux from the core 4 passes the core 5. With the winding directions shown the voltages induced by the flux in the coils 9 and 10 will be added and cause an instrument reading.

If instead the object is exposed to a torque around the axis of the bore the reluctances between the end faces of the cores 3 and 4 as well as 5 and 6 will change, which does not, however, disturb the symmetry in the field, and thereby does not cause induced voltage in the coils 9, 10.

Finally, if the bore is central and the object to be measured is exposed to bending, a tensile stress in the surface in front of one of the two pole configurations will be counter-acted by an equally large compressive stress in the surface in front of the opposite pole configuration so that in this case also no voltage is obtained from the two series connected secondary coils of the measuring means.

I claim:

1. Means for measuring tensile or compressive stresses in an object of magnetostrictive material having a cylindrical bore, comprising a cylindrical body having therein four separate, barshaped magnetic cores, said cores being arranged parallel to each other and to a diameter of said cylindrical body, the end faces of said magnetic cores being positioned at the corners of a quadrangle, which, on the development of the surface of said body, is symmetrical to a diagonal of said quadrangle, each of said cores having a winding, means connecting the windings of two diagonally situated cores in series to each other and to an alternating current source, and means connecting the windings on the other two cores in series to each other and to a voltage-sensitive-measuring device.

2. Means for measuring tensile or compressive stresses as claimed in claim 1, said four magnetic cores being cast in a solid body of resin from which said cylindrical body is formed with a diameter which as nearly as possible agrees with the diameter of said bore in order that said cylindrical body with push or press fit may be inserted in said bore, and that the air gaps between the ends of said magnetic cores and the surface of said bore shall be as small as possible.

References Cited by the Examiner
UNITED STATES PATENTS

| | | | |
|---|---|---|---|
| 2,370,845 | 3/45 | Davis | 73—88.5 X |
| 2,912,642 | 11/59 | Dahle | 73—88.5 X |

RICHARD C. QUEISSER, *Primary Examiner.*